United States Patent
Romagnoli

[11] Patent Number: 6,149,510
[45] Date of Patent: Nov. 21, 2000

[54] ABRADING BLADE

[76] Inventor: Brian A. Romagnoli, 315 Francis Dr., Havertown, Pa. 19083

[21] Appl. No.: 09/261,037

[22] Filed: Mar. 2, 1999

[51] Int. Cl.[7] ........................................................ B26B 1/00
[52] U.S. Cl. .............................. 451/356; 125/12; 83/697; 30/357
[58] Field of Search .................... 451/356; 125/12, 125/22; 83/697, 750; 30/357, 392

[56] References Cited

U.S. PATENT DOCUMENTS

| | | | |
|---|---|---|---|
| D. 313,733 | 1/1991 | Pastore | D8/61 |
| D. 323,100 | 1/1992 | Pastore | D8/70 |
| 3,111,970 | 11/1963 | Priest et al. | 30/357 X |
| 3,553,905 | 1/1971 | Lemelson | 30/357 X |
| 3,630,699 | 12/1971 | Catlin | 451/356 X |
| 3,977,289 | 8/1976 | Tuke | 30/392 X |
| 4,064,588 | 12/1977 | Cooper | 15/236 R |
| 4,083,112 | 4/1978 | Palm | 30/392 X |
| 4,155,142 | 5/1979 | Demetriadis | 15/236 C |
| 4,156,966 | 6/1979 | Eubank | 30/166 R |
| 4,338,718 | 7/1982 | Olkkola | 30/171 |
| 4,435,923 | 3/1984 | Regina | 51/170 TL |
| 4,481,689 | 11/1984 | Westmoreland | 15/236 R |
| 4,739,557 | 4/1988 | Wagner | 30/392 |
| 4,953,301 | 9/1990 | Dobbs, Jr. | 30/392 |
| 4,984,369 | 1/1991 | Flint et al. | 30/374 |
| 5,596,810 | 1/1997 | Neubert et al. | 30/392 X |
| 5,651,727 | 7/1997 | Weinstein et al. | 451/344 |
| 5,692,308 | 12/1997 | Di Libero | 30/357 X |

*Primary Examiner*—David A. Scherbel
*Assistant Examiner*—Anthony Ojini
*Attorney, Agent, or Firm*—Synnestvedt & Lechner LLP

[57] ABSTRACT

An abrading blade having a shank portion configured for attachment to a conventional reciprocating saw and a cutting edge extending along its lower end. The cutting edge is oriented to be substantially parallel to a line of reciprocation defined by the reciprocal motion of the saw's reciprocating spindle. The blade's cutting edge is spaced from the line of reciprocation a distance sufficient to permit clearance of the saw with the work surface while the blade is being used to abrade in a direction substantially parallel to the line of reciprocation along the work surface.

24 Claims, 5 Drawing Sheets

ABRADING BLADE

FIELD OF THE INVENTION

This invention relates generally to an abrading blade, and more particularly to an abrading blade used with a reciprocating saw for removing grout between neighboring tiles in a tiled surface.

BACKGROUND OF THE INVENTION

To repair or reconstruct tiled surfaces, such as bathroom or kitchen walls or floors, old cementitious material (i.e., grout) must be removed and replaced. Such grout is sometimes removed by chipping, cutting or abrading the grout with a hand tool not specifically designed for the task. Alternatively, the grout may be removed using hand tools specifically designed for grout abrasion, such as those disclosed in U.S. Pat. Nos. 4,064,588 to Cooper, 4,155,142 to Demetriadis, 4,156,966 to Eubank and 4,338,718 to Olkkola. These tools are generally manually reciprocated along the grouted surface with sufficient pressure to abrade and remove the grout. Some of these tools are designed more for minor abrasion, as for cleaning grout, than for complete removal of grout. In either case, a considerable amount of manual labor is required.

Accordingly, power tools have been developed which are specifically designed for the sole purpose of grout removal. Such tools are disclosed, for example, in U.S. Pat. Nos. 4,435,923 to Regina and 5,651,727 to Weinstein et al. However, such tools are typically too expensive to be suitable for purchase by a homeowner or other person performing grout removal only occasionally.

Accordingly, it is an object of the present invention to provide an abrading blade suitable for the removal of grout. It is another object to provide an abrading blade which may be used with a conventional multipurpose powerable saw. It is yet another object of the present invention to provide an abrading blade which removes grout by reciprocation along a grout surface. It is a further object to provide an abrading blade which affords control and stability during high-speed reciprocation. It is yet a further object to provide such a blade which is of sturdy construction and is inexpensive to manufacture.

SUMMARY OF THE INVENTION

In broad terms, the invention provides a blade for cutting a work surface and which is attachable to a reciprocating saw having a spindle reciprocable along a line of reciprocation. The blade includes a rigid body having a lower end. The blade also has a shank portion extending rearwardly from the body and which is configured for attachment to the spindle of the saw for reciprocation therewith. A cutting edge extends along the lower end of the blade for engaging the work surface. The cutting edge is spaced perpendicularly from the line of reciprocation a distance sufficient to permit clearance of the saw from the work surface when the shank is attached to the spindle and the cutting edge engages the work surface such that the line of reciprocation is parallel to the work surface. Reciprocating saws, such as those marketed under the trademark Sawzall®, use the blade to cut in a direction perpendicular to the line of reciprocation which is also substantially perpendicular to the cutting edge of the blade. With the present invention however, the blade can be moved in a direction parallel with the work surface as it cuts. The present invention allows the use of such novel blades with existing reciprocating saws to cut work surfaces such as tile grout which before could not be done.

DESCRIPTION OF THE DRAWINGS

FIG. 1 is elevational view of a blade in accordance with the present invention for abrading grout adjacent inlay tiles showing a shank adapted for inverted attachment to a Milwaukee® Sawzal® reciprocating saw or the like;

DETAILED DESCRIPTION

The present invention relates to an abrading blade. While it is contemplated that such an abrading blade may be used for a variety of abrasion purposes, the abrading blade disclosed is particularly useful for removing grout between neighboring tiles in a tiled surface.

Figure 1:
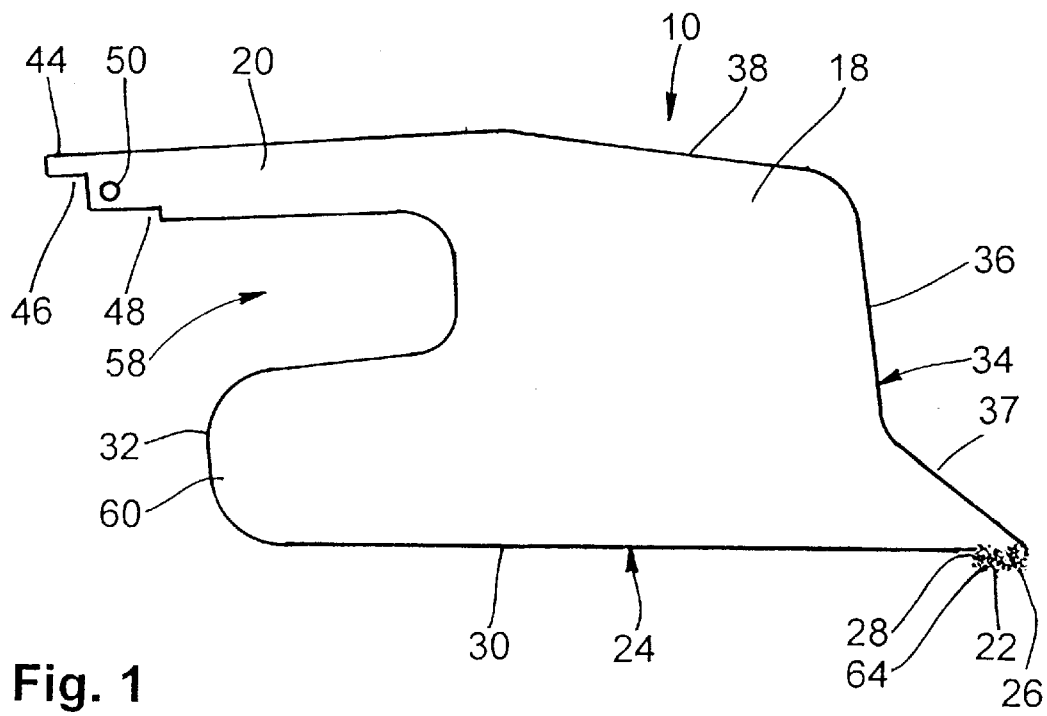
Figure 5:
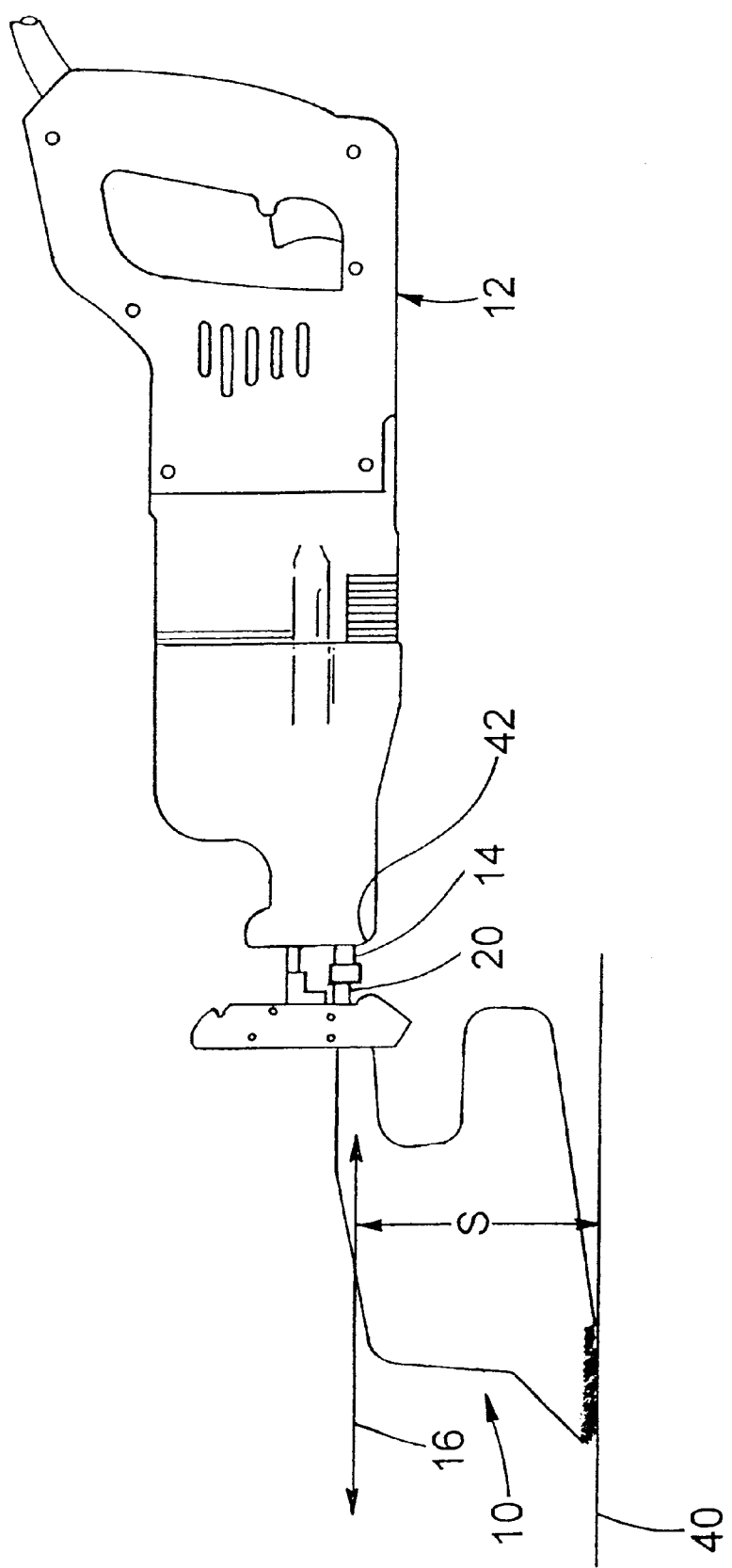
FIG. 5 is a plan view of a saw having a blade in accordance with the present invention, the saw being in an inverted position.

Illustrated in FIGS. 1 and 5 is an abrading blade 10 in accordance with the present invention for attachment to a reciprocating saw 12 having a spindle 14 which is reciprocable along a line of reciprocation 16, the line of reciprocation 16 being generally defined by the reciprocal motion of the spindle 14. Examples of such saws 12 include saws sold under the trademark Milwaukee® Sawzall® and Bosch Saberplus™ and those commonly known as jigsaws or saber saws.

The blade 10 comprises a rigid body 18, a shank portion 20 extending rearwardly from the body, and a cutting edge 22 extending along a lower end 24 of the body 18 (abrasive granules 64 being shown on the cutting edge which integrally extend from the body 18). The cutting edge 22 has a leading end 26 and a trailing end 28. The lower end 24 also includes a trailing edge 30 extending from the trailing end 28 of the cutting edge 22 to a rear end 32. At a front end 34 of the blade is a forward edge 36 extending from the leading end 26 to a top end 38 which in turn extends to the shank portion 20. The shank portion 20 is configured for attachment to the spindle 14 of the reciprocating saw 12 for reciprocation therewith. The cutting edge 22 is oriented to be substantially parallel to the line of reciprocation 16 when the blade is attached to the saw 12. Furthermore, the cutting edge 22 is spaced perpendicularly from the line of reciprocation 16 a sufficient distance S to permit clearance of the saw 12 with a work surface 40, i.e., there being clearance between the lowest point 42 of the saw 12 and the work surface 40 when the cutting edge 22 engages the work surface 40 and the line of reciprocation 16 is parallel to the work surface 40 as shown in FIG. 5.

The shank portion 20 of FIG. 1 is configured for attachment to the spindle 14 of a reciprocating saw 12 of the type sold under the trademark Milwaukee® Sawzall®. However, as discussed further below, a blade 10 may be provided having a shank 20 adapted for use with a variety of conventional multipurpose powerable saws. The shank portion 20 shown in FIG. 1 has a rearwardly extending offset tab 44 and defines notches 46 and 48 and a hole 50 specific for the Sawzall®. In the preferred embodiment, the shank portion 20 is configured for attachment to the saw 12 in an inverted position, as shown in FIG. 5, to provide additional clearance between the saw 12 and the work surface 40 when the blade is in use.

Figure 2:
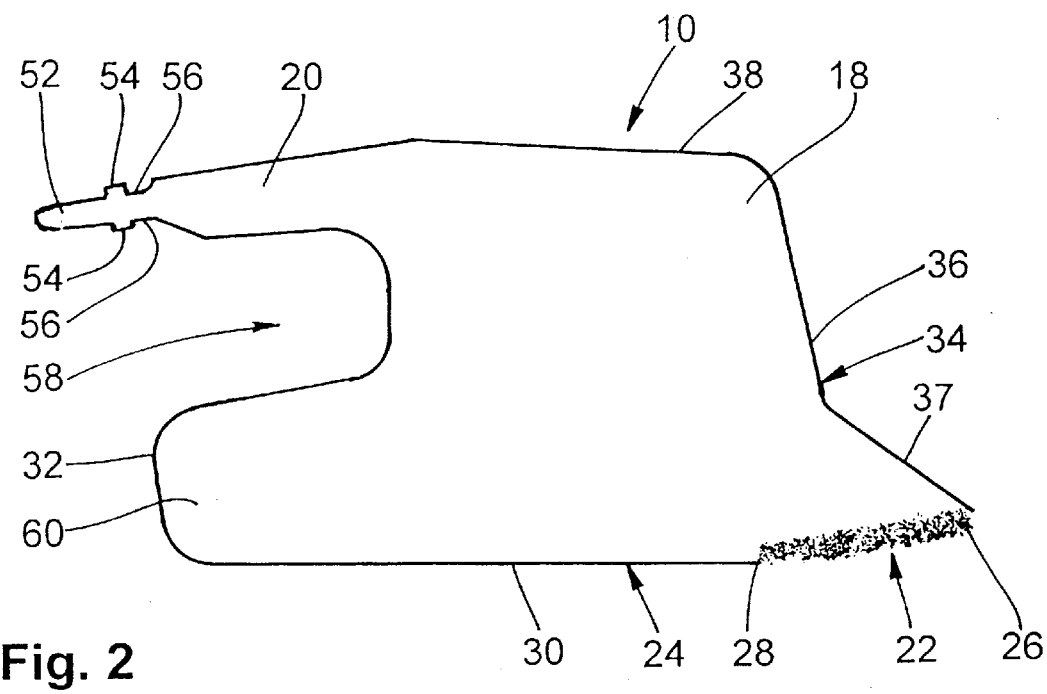
FIG. 2 is an elevational view of a blade in accordance with the present invention for abrading grout between tiles showing a shank adapted for inverted attachment to a Bosch Sabre Plus™ reciprocating saw.
Figure 3:
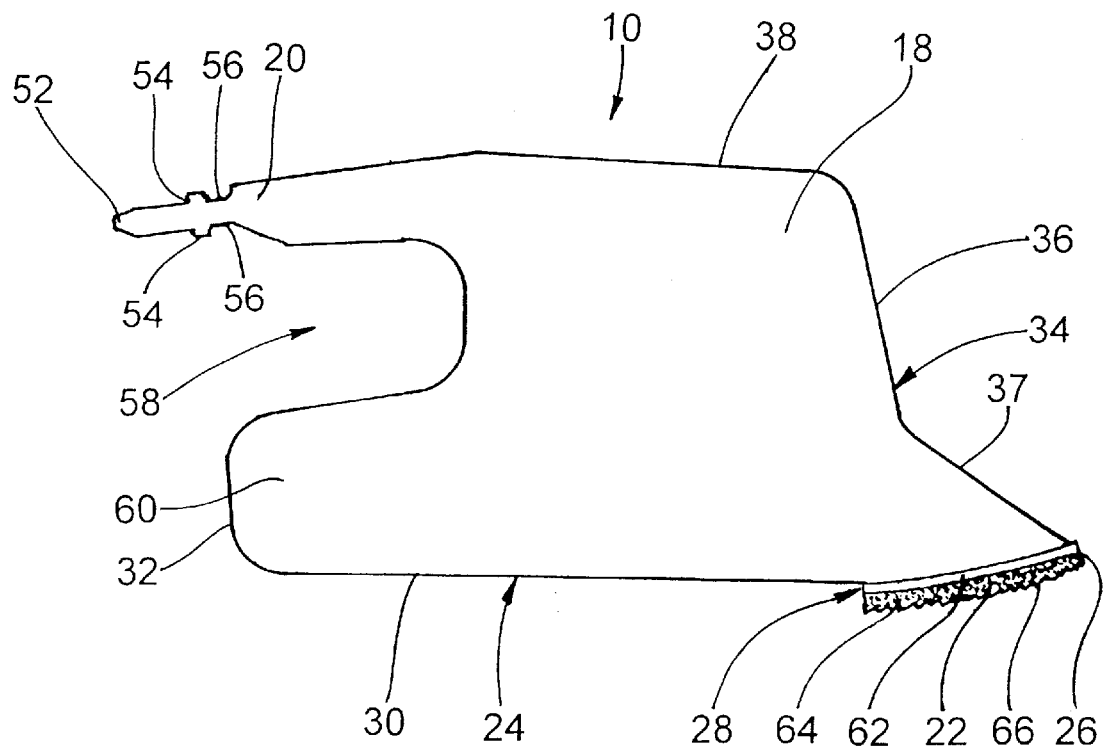
FIG. 3 is an elevational view of a blade in accordance with the present invention having a shoe for abrading a wide bead of grout and showing a shank adapted for inverted attachment to a Bosch Sabre Plus® reciprocating saw.
Figure 6:
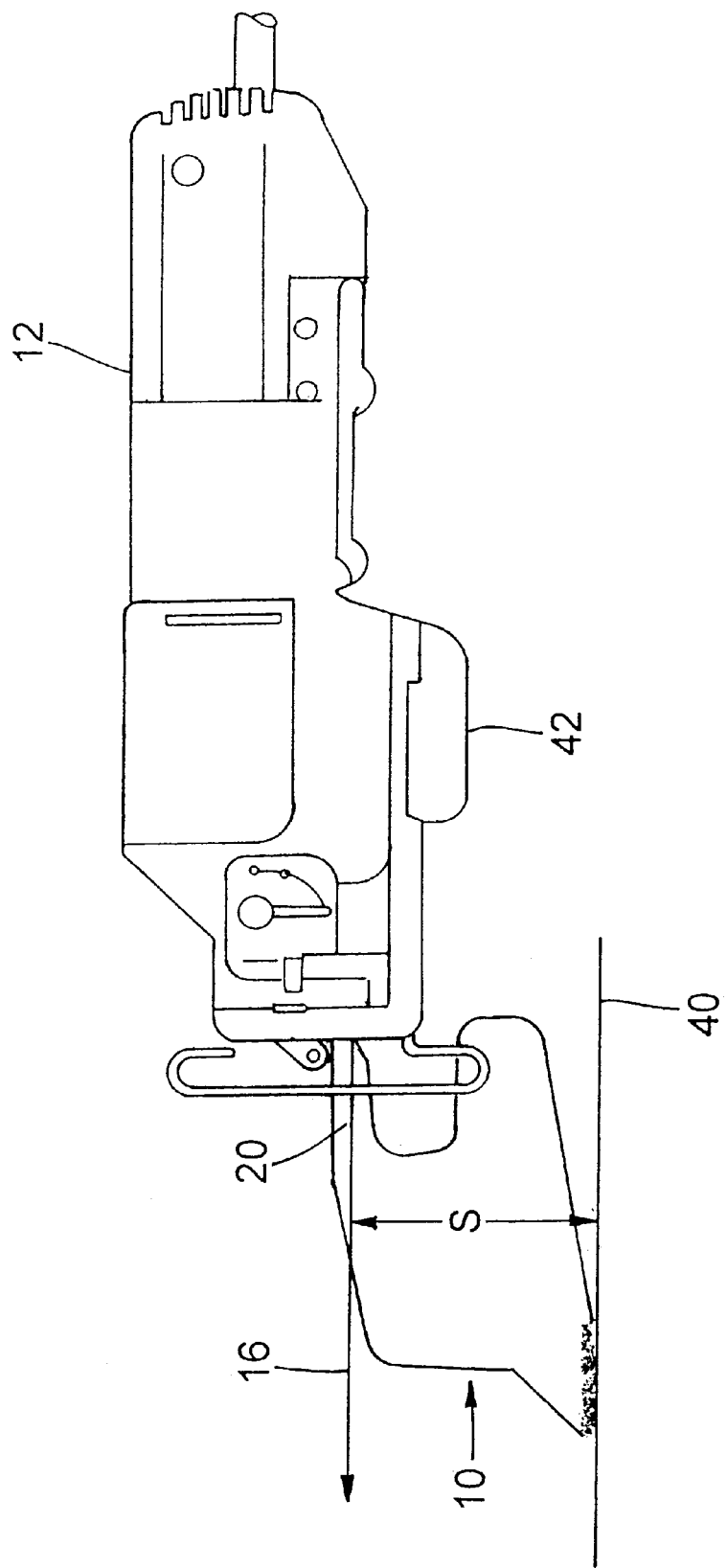
FIG. 6 a plan view of a blade in accordance with the present invention shown attached to another type of saw.
Figure 7:
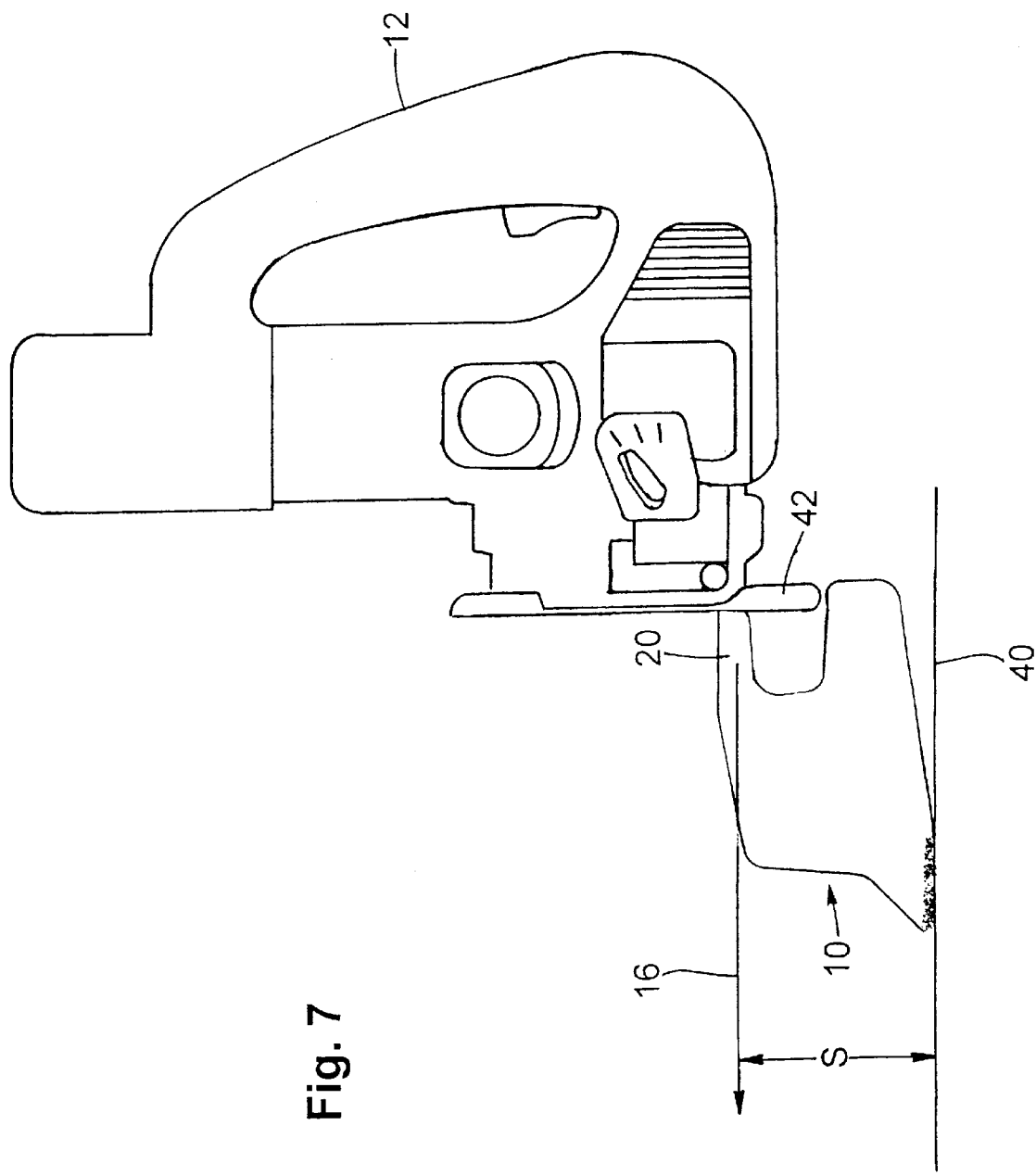
FIG. 7 is a plan view of a blade in accordance with the present invention shown attached to a jig saw.

Illustrated in FIGS. 2 and 3 are alternate embodiments having a shank portion 20 configured for attachment to a reciprocating saw of the type sold under the trademark Bosch Sabre Plus™. Here, the shank portion 20 comprises a rearwardly extending central tab 52 and a pair of opposed shoulders 54 extending laterally from the tab 52 and defining a pair of notches 56. Preferably, the shank portion 20 is configured for attachment to the saw in an inverted position, as described above. See FIG. 6. In another alternate embodiment, FIG. 4, the shank portion 20 is configured for attachment to a jigsaw or saber saw as shown in FIG. 7.

Returning to FIG. 1, the rear end 32 is preferably contoured to provide a clearance notch 58 and a rearwardly extending stabilizing leg 60 adjacent the clearance notch 58 as shown in FIGS. 1–3. The rear end 32 is contoured to provide a clearance notch 58 of sufficient height and depth to prevent interference of the blade 10 with any part of the reciprocating saw 12 when the spindle 14 is reciprocated, the height being determined by the structure of the saw and the depth being determined by the stroke length of the saw's spindle. The stabilizing leg 60 extends rearwardly of the body and is believed to enhance stability of the blade 10 when reciprocated at the high speeds associated with reciprocating saws of this type.

The forward edge 36 recedes from the leading end 26 of the cutting edge 22. The receding forward edge 36 provides clearance of the blade 10 with any surface that may abut the work surface 40 during reciprocation of the blade, e.g., to prevent collision of the blade 10 with a wall when abrading grout adjacent the wall on a tiled floor. While the forward edge 36 may recede from the leading end 26 in any suitable manner, it is preferable that the forward edge 36 have a portion 37 adjacent the leading end 26 which is substantially straight and which forms an acute angle with the cutting edge 22, as shown in FIGS. 1–4. Such an arrangement provides clearance of the blade 10 with an abutting surface through a broader range of orientations of the blade relative to the abutting surface.

Just as the configuration of the shank portion 20 of the blade 10 may depend upon the saw with which it is intended to be used, other aspects of the blade 10 may vary depending upon its intended use. As shown in FIG. 1, the cutting edge 22 extends below the trailing edge 30, put another way, is spaced from the trailing edge 30. This allows the trailing edge 30 sufficient clearance over neighboring tiles when the cutting edge 22 is cutting. In this embodiment, the length of the cutting edge 22 is preferably short, i.e., preferably less than one inch in length from the leading end 26 to the trailing end 28, and more preferably approximately 0.375 inches in length. Also in this embodiment, the cutting edge 22 is preferably substantially straight and substantially parallel with the line of reciprocation 16. The short length of the cutting edge 22 is conducive to abrading and removing grout adjacent small inlay tiles. Such inlay tiles are usually one inch square. However, a reciprocating saw 12 having a short stroke should also be used to prevent collision of the abrading blade with tiles adjacent an inlay tile and the resulting damage which would otherwise occur. For example, for abrasion adjacent one inch square inlay tiles, a saw having a stroke of less than one inch should be used. Additionally, the combined length of the stroke of the reciprocating saw and the length of the cutting edge 22 should be no more than one inch to prevent such collisions and damage.

In the embodiment of FIG. 2, the trailing edge 30 extends from the trailing end 28 of the cutting edge 22 and is inclined relative thereto. The length of the cutting edge 22 is preferably greater than one inch in length from the leading end 26 to the trailing end 28 and most preferably approximately 1.25 inches in length. This embodiment is particularly useful for abrading and removing grout adjacent mid-sized tiles. Such tiles are usually between four and eight inches square. The length of the cutting edge 22 and the configuration of the trailing edge 30 of the lower end 24 relative to the cutting edge 22 are conducive to abrasion along lines of grout formed by aligned tiles and for lines of grout which do not intersect other tiles, as with inlay tiles. In such an arrangement, the length of the stroke of the reciprocating saw is not critical.

In the embodiment of FIG. 3 the blade 10 has a trailing edge 30 which extends from the trailing end 28 of the cutting edge 22 and is inclined relative thereto as in FIG. 2. In this embodiment, however, the cutting edge 22 is formed on a shoe 62 fixed to the lower end 24 of the blade. The shoe 62 has a width greater than that of the body 18 of the blade 10 to permit abrasion of a wider area of grout between widely spaced tiles. Additionally, the shoe 62 is preferably upturned adjacent the leading end 26 of the cutting edge 22 to prevent an angular collision of the leading end 26 with the grout and to facilitate abrasion along the grout surface. The length of the cutting edge 22 is relatively long, i.e., preferably greater than one inch in length from the leading end 26 to the trailing end 28, and most preferably approximately 1.5 inches in length. The shoe 62 is particularly useful for abrading and removing grout adjacent widely spaced tiles. Large tiles, typically between twelve and twenty-four inches square, are commonly set in a widely spaced arrangement. Such a blade is also useful for abrasion of mortar between adjacent bricks and for general purpose abrasion. In such an arrangement, the length of the stroke of the reciprocating saw is not critical.

Figure 4:
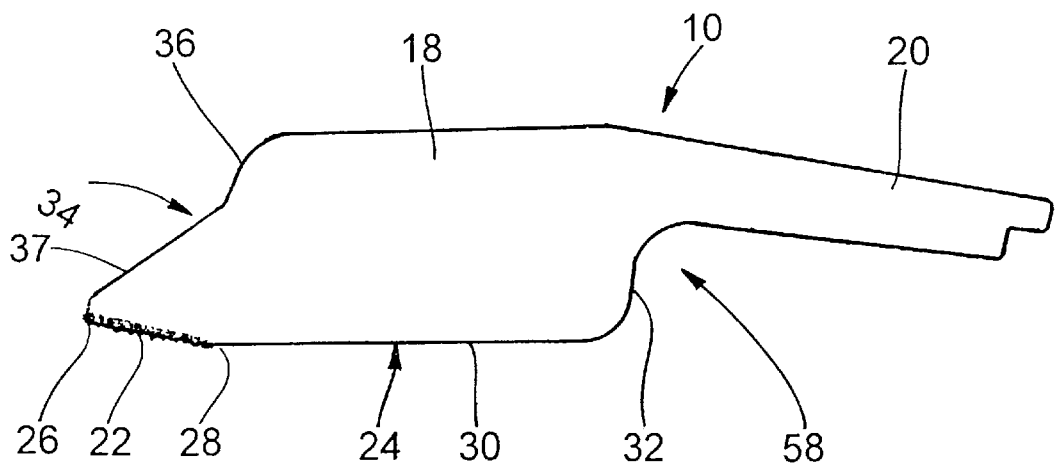
FIG. 4 is an elevational view of a blade in accordance with the present invention showing a body and shank adapted for attachment to a jigsaw.

The embodiment of FIG. 4 is adapted for attachment to a jigsaw or saber saw. The blade 10 has a trailing edge 30 which extends from the cutting edge 22 and is inclined relative thereto. The length of the cutting edge 22 is preferably greater than one inch in length, and most preferably about 1.25 inches in length. This embodiment is particularly useful for abrading and removing grout adjacent mid-sized tiles. The length of the cutting edge 22 and the configuration of the cutting edge 22 relative to the trailing edge 30 are conducive to abrading lines of grout formed by adjacent aligned tiles. In such an arrangement, the length of the stroke of the reciprocating saw is not critical. Note that in this configuration, the rear end 32 of the blade 10 forms a clearance notch but that no stabilizing leg 60 is necessary, due to the speed of reciprocation of the spindle of a jigsaw or saber saw. Additionally, the need for a stabilizing leg 60 is minimized due to the relatively short distance "S" between the cutting edge 22 and the line of reciprocation. This relatively short distance is feasible due to the configuration of a jigsaw or saber saw and the mounting of the blade in a position such that the cutting surface faces forwardly when the saw is gripped in the usual fashion.

Each of the blades 10 has a cutting edge 22 spaced perpendicularly from the line of reciprocation 16 a sufficient distance S to permit clearance of the saw 10 with the work surface 40, as discussed above. Reciprocating saws are generally operated such that the saw is held in a position in which the spindle reciprocates perpendicularly to the line of travel of the saw as the blade moves through work surface. Accordingly, clearance of the saw structure with the work surface is rarely a problem. However, the present invention contemplates use of a reciprocating saw operated in a position such that the spindle reciprocates substantially parallel to the line of travel of the saw as seen in FIG. 5. Thus, the cutting edge must be distanced from the line of reciprocation 16 sufficiently to permit clearance of the lowest point 42 of the saw from the work surface. Moreover, it is desirable that the distance be sufficient to provide clearance of the saw as well as for hand holding the saw and maneuvering the saw.

In the case of reciprocating saws such as the Milwaukee® Sawzall® and the Bosch Sabre Plus™, this distance can be minimized by mounting the blade in an inverted position, such that the cutting edge 22 faces upwardly when the saw, seen in FIG. 5, is gripped in the usual position. With a reciprocating saw such as a jigsaw or saber saw, the blade need not be inverted to minimize the distance. See FIG. 7. Due to the structure of a jigsaw or saber saw, a distance "S" between the cutting edge 22 and the line of reciprocation 16 of at least about two inches is suitable, the distance from the line of reciprocation being measured perpendicularly therefrom. In the case of a Milwaukee® Sawzall® or the Bosch Sabre Plus™, a distance, "S", of at least about three inches is suitable. As the distance increases, the blade tends to become less stable during reciprocation, tending to cause damage to tiles adjacent the grout to be cut. Accordingly, inclusion of a stabilizing leg 60 is increasingly helpful as the distance "S" increases.

In any configuration, the cutting edge 22 may take any suitable form. In one embodiment, seen in FIG. 3, the cutting edge 22 has a toothed blade 66. However, in the preferred embodiment, the cutting edge 22 has an abrasive 64 joined to the blade, such as carbide steel granules. The body 18 of the blade is preferably constructed of steel material which provides for a rigid body and an inexpensive blade.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A blade for cutting a work surface, said blade being attachable to a reciprocating saw having a spindle reciprocable along a line of reciprocation, said blade comprising:
   a rigid body having a lower end;
   a shank portion extending rearwardly from said body, said shank being configured for attachment to said spindle for reciprocation therewith; and
   a cutting edge extending along said lower end for engaging the work surface, said cutting edge being spaced perpendicularly from said line of reciprocation a distance sufficient to permit clearance of the saw from the work surface when said shank is attached to the spindle and said cutting edge engages said work surface such that said line of reciprocation is parallel to said work surface.

2. A blade in accordance with claim 1 further comprising a rear end having a notch to prevent interference of the blade with the reciprocating saw when the blade is reciprocated.

3. A blade in accordance with claim 2 wherein said rear end further includes a rearwardly extending stabilizing leg adjacent said notch.

4. A blade in accordance with claim 2 wherein said cutting edge comprises a leading end, and said blade further comprises a forward edge receding rearward and upward from said leading end.

5. A blade in accordance with claim 4, wherein said forward edge is substantially straight and forms an acute angle with said leading end.

6. A blade in accordance with claim 5 wherein said shank is configured for attaching the blade to the spindle of said saw in an inverted position.

7. A blade in accordance with claim 2 wherein said lower edge has a trailing edge adjacent to and spaced from said cutting edge and extending to said rear end.

8. A blade in accordance with claim 7 wherein the length of the cutting edge is less than one inch.

9. A blade in accordance with claim 8 wherein the length of the cutting edge is no more than about 0.375 inches.

10. A blade in accordance with claim 9 wherein the trailing edge is substantially straight.

11. A blade in accordance with claim 2 wherein the blade has a trailing edge which extends from said cutting edge to said rear end and is inclined relative to the cutting edge.

12. A blade in accordance with claim 11 wherein the length of said cutting edge is greater than one inch.

13. A blade in accordance with claim 12 wherein the distance between the leading end and the trailing end of the cutting edge is approximately 1.25 inches.

14. A blade in accordance with claim 2 wherein said cutting edge includes a shoe attached to said lower edge of said blade, said shoe having a width greater than that of the body of the blade.

15. A blade in accordance with claim 14 wherein the shoe is upturned adjacent the leading end of the cutting edge.

16. A blade in accordance with claim 2 wherein the cutting edge comprises a toothed blade.

17. A blade in accordance with claim 2 wherein the cutting edge comprises an abrasive.

18. A blade in accordance with claim 17, wherein the abrasive comprises carbide steel granules.

19. A blade in accordance with claim 1 wherein said cutting edge is spaced at least about two inches from said line of reciprocation measured perpendicularly therefrom.

20. A blade in accordance with claim 1 wherein said cutting edge is spaced at least about 2.5 inches from said line of reciprocation measured perpendicularly therefrom.

21. A blade in accordance with claim 1 wherein said cutting edge is spaced at least about 3 inches from said line of reciprocation measured perpendicularly therefrom.

22. A cutting assembly for cutting a work surface, comprising:
   a reciprocating saw having a spindle reciprocable along a line of reciprocation;
   a blade comprising a rigid body, a lower end, a shank, and a cutting edge;
   said shank extending rearwardly from said rigid body and attachable to said spindle for reciprocation therewith; and
   a cutting edge along said lower end, said cutting edge being spaced perpendicularly from said line of reciprocation a distance sufficient to permit clearance of the saw from the work surface when said shank is attached to said spindle and said cutting edge engages the work surface such that said line of reciprocation is parallel to the work surface.

23. The blade of claim 22, wherein the cutting edge is spaced from the line of reciprocation at least about 2 inches.

24. A blade for cutting a work surface, said blade being attachable to a reciprocating saw having a reciprocable spindle, said blade comprising:

a rigid body having a lower end;

a shank portion extending rearwardly from said body, said shank being configured for attachment to the spindle for reciprocation therewith; and a cutting edge extending along said lower end for engaging the work surface, said cutting edge being spaced perpendicularly from said shank portion a distance sufficient to permit clearance of the saw from the work surface when said shank portion is attached to the spindle and said cutting edge engages said work surface such that said shank portion is reciprocable substantially parallel to said work surface.

* * * * *